United States Patent Office 3,580,967
Patented May 25, 1971

3,580,967
SUBSTITUTED 2-AMINOMALONAMIDES PRODUCTION
John R. Norell, Bartlesville, Okla., assignor to Phillips Petroleum Company
No Drawing. Continuation-in-part of application Ser. No. 560,859, June 27, 1966. This application Jan. 31, 1969, Ser. No. 795,676
Int. Cl. C07c 103/33
U.S. Cl. 260—557    8 Claims

ABSTRACT OF THE DISCLOSURE

Production of 2-aminomalonamides having hydrocarbyl substituents, which amides are useful as pharmaceutical and agricultural chemicals, antiplasticizers, processing aids and the like, by the reaction of olefins, hydrogen cyanide and anhydrous hydrogen fluoride followed by hydrolysis.

BACKGROUND OF THE INVENTION

This application is a continuation-in-part application of my copending application having Ser. No. 560,859, filed June 27, 1966, now abandoned.

This invention relates to the production of substituted 2-aminomalonamides. In another aspect, this invention relates to a process for the production of substituted 2-aminomalonamides upon hydrolysis of products resulting from the reaction of an olefin with hydrogen cyanide and anhydrous hydrogen fluoride. In accordance with a further aspect, this invention relates to novel hydrocarbyl substituted 2-aminomalonamides produced in accordance with said aforementioned process.

In the preparation of amides by employing the Ritter reaction, in which a suitable nitrile and a suitable olefin are reacted in the presence of a material such as strong sulfuric acid, it is frequently difficult to control the reaction temperature and extensive efforts are usually required in order to insure the control of the dangerous exotherm resulting from such a reaction. Also, in the known procedures for the preparation of amides, processes at some times resulted in poor yields of the desired product.

According to the invention set forth in my copending application, noted above, it was found that the yields of amides could be substantially increased by carrying out the reaction of saturated and ethylenically unsaturated hydrocarbons and cyanides in the presence of hydrogen fluoride. Further, according to said copending application, it was found that by carrying out the reaction of saturated and ethylenically unsaturated hydrocarbons with a cyanide in the presence of sulfur dioxide, isomerization and polymerization side reactions were minimized.

Accordingly, an object of this invention is to provide a process for the production of substituted 2-aminomalonamides.

Another object of this invention is to provide a process yielding a high percentage of substituted 2-aminomalonamides in high purity.

A further object of this invention is to provide novel amide products.

A further object of this invention is to provide a novel 2-aminomalonamide having hydrocarbyl substituents.

Other aspects, objects, and the several advantages of the invention will be apparent to those skilled in the art from a study of this disclosure and the appended claims.

SUMMARY OF THE INVENTION

In accordance with the present invention, 2-aminomalonamides having a hydrocarbyl substituent on each of the three nitrogen atoms are produced by interaction of olefins, hydrogen cyanide, and anhydrous hydrogen fluoride, followed by hydrolysis.

Further in accordance with the invention, the following novel substituted 2-aminomalonamides have been isolated following hydrolysis of the reaction mixture resulting from the interaction of olefins, hydrogen cyanide and anhydrous hydrogen fluoride:

(1) From propylene:
   N,N'-diisopropyl-2-(isopropylamino)malonamide
(2) From cyclohexene:
   N,N'-dicyclohexyl-2-(cyclohexylamino)malonamide
(3) From cyclopentene:
   N,N'-dicyclopentyl-2-(cyclopentylamino)malonamide
(4) From cyclododecene:
   N,N'-dicyclododecyl-2-(cyclododecylamino)malonamide
(5) From 2-norbornene:
   N,N'-di-2-norbornyl-2-(2-norbornylamino)malonamide
(6) From 1-pentene:
   Mixture of N,N'-dipentyl-2-(pentylamino)malonamides, where pentyl is 1-methylbutyl or 1-ethylpropyl

DESCRIPTION OF THE PREFERRED EMBODIMENTS

Olefins which can be used to produce the substituted 2 aminomalonamides of this invention can be represented by the formula

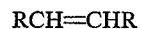

wherein each R is selected from hydrogen and alkyl, cycloalkyl, and aryl radicals, and combinations thereof such as alkaryl radicals, aralkyl radicals, and the like with the further proviso that two R groups, together, on adjacent carbon atoms, can represent a divalent radical selected from alkylene, cycloalkylene, cycloalkyl- and aryl-substituted alkylene, and alkyl-, cycloalkyl-, and aryl-substituted cycloalkylene, the total number of carbon atoms in the olefin molecule preferably being within the range of 2 to about 30. Especially useful are alkenes having 2 to about 12 carbon atoms and cycloalkenes having 4 to about 12 carbon atoms.

Examples of some olefins which can be employed in the process include ethylene, propene (propylene), 1-butene, 2-butene, 1-pentene, 2-pentene, 3-hexene, 1-octene, 2-octene, 2-decene, 1-dodecene, 4-tetradecene, 1-hexadecene, 1-octadecene, 10-eicosene, 1-triacontene, 3-ethyl-1-pentene, 4-isopropyl-2-octene, 6-tert-butyl-3-decene, 1-cyclohexyl-2-butene, 2 - (2-methylcyclopentyl)-3-hexene, styrene, 1-phenyl-2-pentene, 2-p-tolyl-3-octene, cyclobutene, cyclopentene, cyclohexene, 3-methylcyclooctene, cyclododecene, cyclooctadecene, 4-phenylcyclohexene, 5-cyclopentylcyclooctene, 2-norbornene, 5-methyl-2-norbornene, 5-phenyl-2-norbornene, 1-cyclohexyl-2-norbornene, and the like.

As indicated above, the cyanide compound reacted with the olefin according to the invention is hydrogen cyanide. It is possible to use an alkali metal cyanide which will react in situ with the hydrogen fluoride to produce hydrogen cyanide.

The hydrogen fluoride employed according to the invention is anhydrous.

Substituted 2-aminomalonamides which can be prepared by the process of this invention can be represented by the formula

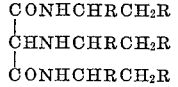

wherein each R is as defined above. When the olefin employed is one which can be protonated to give a carbonium ion capable of isomerization to one or more different carbonium ions, the three —CHRCH$_2$R groups in each molecule of the substituted 2-aminomalonamide product can be alike or isomeric with each other. In such instances each of the three nitrogen atoms in each substituted 2-aminomalonamide molecule can be attached to a carbon atom which was initially connected to the olefinic double bond, or it can be attached to an adjacent carbon atom or to a carbon atom further removed. The total number of carbon atoms in the 2-aminomalonamide does not exceed about 93 carbon atoms.

Examples of some substituted 2-aminomalonamides which can be prepared by this process include N,N'-diethyl-2-(ethylamino)malonamide,
N,N'-diisopropyl-2-(isopropylamino)malonamide,
N,N'-di-sec-butyl-2-(sec-butylamino)malonamide,
N,N'-bis(1-methylbutyl)-2-(1-methylbutylamino)-malonamide,
N,N'-bis(1-ethylpropyl)-2-(1-ethylpropylamino)-malonamide,
N,N'-bis(1-ethylbutyl)-2-(1-ethylbutylamino)malonamide,
N,N'-bis(1-methylheptyl)-2-(1-methylheptylamino)-malonamide,
N,N'-bis(1-ethyloctyl)-2-(1-ethyloctylamino)malonamide,
N,N'-bis(1-methylundecyl)-2-(1-methylundecylamino)malonamide,
N,N'-bis(1-butyldecyl)-2-(1-butyldecylamino)-malonamide,
N,N'-bis(1-methylpentadecyl)-2-(1-methylpentadecylamino)malonamide,
N,N'-bis(1-nonylundecyl)-2-(1-nonylundecylamino)-malonamide,
N,N'-bis(1-methylnonacosyl)-2-(1-methylnonacosylamino)malonamide,
N,N'-bis(1-methyl-2-ethylbutyl)-2-(1-methyl-2-ethylbutylamino)malonamide,
N,N'-bis(1-ethyl-2-isopropylhexyl)-2-(1-ethyl-2-isopropylhexylamino)malonamide,
N,N'-bis(1-propyl-3-tert-butylheptyl)-2-(1-propyl-3-tertbutylheptylamino)malonamide,
N,N'-bis(1-methyl-3-cyclohexylpropyl)-2-(1-methyl-3-cyclohexylpropylamino)malonamide,
N,N'-bis[1-ethyl-3-(2-methylcyclopentyl)butyl]-2-[1-ethyl-3-(2-methylcyclopentyl)butylamino]-malonamide,
N,N'-bis(α-methylbenzyl)-2-(α-methylbenzylamino)malonamide,
N,N'-bis(1-benzylbutyl)-2-(1-benzylbutylamino)-malonamide,
N,N'-bis[1-(2-p-tolylpropyl)pentyl]-2-[1-(2-p-tolylpropyl)pentylamino]malonamide,
N,N'-dicyclobutyl-2-(cyclobutylamino)malonamide,
N,N'-dicyclopentyl-2-(cyclopentylamino)malonamide,
N,N'-dicyclohexyl-2-(cyclohexylamino)malonamide,
N,N'-bis(3-methylcyclooctyl)-2-(3-methylcyclooctylamino)malonamide,
N,N'-dicyclododecyl-2-(cyclododecylamino)malonamide,
N,N'-dicyclooctadecyl-2-(cyclooctadecylamino)malonamide,
N,N'-bis(4-phenylcyclohexyl)-2-(4-phenylcyclohexylamino)malonamide,
N,N'-bis(5-cyclopentylcyclooctyl)-2-(5-cyclopentylcyclooctylamino)malonamide,
N,N'-di-2-norbornyl-2-(2-norbornylamino)malonamide,
N,N'-bis(5-methyl-2-norbornyl)-2-(5-methyl-2-norbornylamino)malonamide,
N,N'-bis(5-phenyl-2-norbornyl)-2-(5-phenyl-2-norbornylamino)malonamide,
N,N'-bis(1-cyclohexyl-2-norbornyl)-2-(1-cyclohexyl-2-norbornylamino)malonamide,
N,N'-bis(1-methylbutyl)-2-(1-ethylpropylamino)-malonamide,
N,N'-bis(1-ethylpropyl)-2-(1-methylbutylamino)-malonamide,
N-(1-methylbutyl)-N'-(1-ethylpropyl)-2-(1-methylbutylamino)malonamide,
N-(1-methylbutyl)-N'-(1-ethylpropyl)-2-(1-ethylpropylamino)malonamide, and the like.

In the process of this invention, the hydrogen cyanide:olefin mole ratio can vary over a broad range, but generally will be within the range of about 0.2:1 to 20:1, preferably being within the range of about 0.5:1 to 5:1. If desired, the hydrogen cyanide can be formed in the reaction vessel by reaction of hydrogen fluoride with a cyanide salt, e.g., an alkali metal cyanide such as sodium cyanide, potassium cyanide, or the like. The hydrogen fluoride:olefin mole ratio also can vary over a wide range, but generally will be within the range of about 2:1 to 60:1, preferably being within the range of about 3:1 to 40:1. The hydrogen fluoride must be used in a substantially anhydrous form.

Although the reaction can be carried out over a rather broad temperature range, the temperature generally will be within the range of about −70 to 150° C., preferably being within the range of about 0 to 70° C. The reaction time can vary considerably, depending in part on the reaction temperature and the nature of the olefin reactant, but generally will be within the range of about 1 minute to about 48 hours, usually being within the range of about 10 minutes to about 12 hours. The reaction pressure need be only sufficient to maintain the reactants substantially in the liquid phase. If desired, higher pressures can be employed, e.g., through the use of an added gas such as carbon dioxide, carbon monoxide, nitrogen, helium, or the like.

Preferably, the olefin is added to the mixture of hydrogen cyanide and hydrogen fluoride. The resulting mixture can then be agitated in any convenient manner. Upon substantial completion of the reaction, the reaction mixture can be treated with water, with or without prior recovery of hydrogen fluoride by distillation or other suitable means. The hydrolyzed mixture can be neutralized by conventional procedures employing a suitable base such as sodium hydroxide, sodium carbonate, ammonia, or the like, and the substituted 2-aminomalonamides can then be separated by conventional methods such as extraction with chloroform, methylene chloride, ether, or the like. The substituted 2-aminomalonamides can be isolated and purified by well-known procedures such as crystallization, chromatography, and the like.

The amides produced by the process of this invention have utility as argricultural chemicals such as pesticides, e.g., acaricides, arachnocides, and nematocides, germicides, fungicides, and the like. Additionally, the compounds are useful as anti-plasticizers and processing aids, e.g., in poly(vinyl chloride).

EXAMPLE I

N,N'-diisopropyl-2-(isopropylamino)malonamide from propylene, HCN and HF

Hydrogen fluoride (160 ml., 8.0 moles) was collected in a polyethylene graduate and poured into a 300 ml. Monel reactor and cooled in ice water. Liquid hydrogen cyanide (48 ml., 33 g., 1.22 moles) was collected in a graduated plastic bottle and poured into the cooled HF; a slight exothermic effect was noted as evidenced by puffs of HF vapor; however, no temperature change was noted on a thermometer.

The Monel reactor was capped and pressured with $N_2$ (ca. 150 p.s.i.g.) and the contents by means of a dipstick were blown into a 1-liter autoclave. Propylene (45 g., 1.07 moles) was condensed in a stainless steel bomb and fitted to the large reactor. With a pressure head on the propylene of ca. 150 p.s.i.g., the olefin was bled into the HF-HCN mixture at 23–29° C. with vigorous stirring over a period of 12 minutes. The autoclave was heated to 50° C. with circulating hot water and stirred an additional two hours. After cooling to 24° C., 300 ml. of water followed by 200 ml. $CH_2Cl_2$ were pumped into the autoclave for an "in situ extraction." After stirring an additional 15 minutes, the contents were drained into a polyethylene separatory funnel and HF-$H_2O$ layer extracted once with 150 ml. $CH_2Cl_2$.

The combined $CH_2Cl_2$ layers were made basic with aqueous NaOH, dried over $MgSO_4$, and evaporated to give 6.1 g. of a foul-smelling yellow oil which was discarded. The initial HF-aqueous layer was made basic with 40% NaOH and allowed to stand overnight.

White silky crystals formed which were filtered and air dried to give 45.3 g. (53% crude yield) of yellow solids. The material was recrystallized once from 200 ml. 75% acetone-25% water and then twice from 200 ml. pentane to give two crops of crystals; 10.95 g., M.P. 102.5–104° C., and 9.29 g., M.P. 103–104° C. for a total yield of 20.24 g. or 23.3% isolated yield.

The product is soluble in pentane and very soluble in $CCl_4$, MeOH, EtOH, dil. HCl, pyridine, $C_6H_6$, $CHCl_3$ and $Et_2O$. It is soluble in hot water after a few percent of EtOH has been added and is insoluble in dil. NaOH. Pentane is a better recrystallizing solvent then hexane as the material is too soluble in the latter.

Structure determination

*Analysis.*—Calcd. for $C_{12}H_{25}N_3O_2$ (percent): C, 59.23; H, 10.36; N, 17.27; O, 13.15. (Mol. wt., 243.4.) Found (percent): C, 59.08; H, 10.44; N, 16.93; O, 12.9. (Mol. wt., 256.9—osmometer.) Equivalent weight of 243.0 when titrated with $HClO_4$-HOAc.

EXAMPLE II

N,N'-dicyclohexyl-2-(cyclohexylamino)malonamide

A 1-liter Monel autoclave was charged with a mixture of hydrogen fluoride (160 g., 8.0 mole) and hydrogen cyanide (66 g., 96 ml., 2.4 mole) followed by a $N_2$ pressure of 800 p.s.i.g. Cyclohexene (164 g., 2.0 mole) was pumped into the reactor over a period of 38 minutes at 20° C. and heated at 45° C. for 4 hours with vigorous stirring. The mixture was cooled and methylene chloride (250 ml.) was pumped into the reactor and the contents were drained into a plastic container containing ice. The hydrolyzed solution was stirred vigorously and the layers separated with the bottom layer being made basic by shaking with NaOH solution. Removal of the solvent left 258.4 g. of a viscous red-brown tar. This initial residue was chilled in a refrigerator for 2–4 hours and removed and allowed to stand at room temperature until it crystallized which usually took at least 1½ days. Seeding seemed to make the crystals form faster. The solidified mass was triturated with 85% acetone-15% water and placed in a beaker and chilled. The mixture was filtered and washed with small amounts of cold 85% acetone. The solids were dried, preferably by pressing between paper towels and then air dried. Recrystallization of the tan color solids from 85% acetone gave 47.0 g. (0.13 mole or 19.4% yield) of slightly yellow product, M.P. 120–122° C. Interestingly, two additional recrystallizations from n-hexane gave 26.1 g. of white product which actually melted lower, 118–120° C.

*Analysis.*—Calcd. for $C_{21}H_{37}N_3O_2$ (percent): C, 69.38; H, 10.26; N, 11.56. (Mol. wt., 363.5.) Found (percent): C, 69.44; H, 10.54; N, 11.90. (Mol. wt., 344—osmometer.)

EXAMPLE III

N,N'-dicyclohexyl-2-(cyclohexylamino)malonamide from cyclohexene, sodium cyanide and HF Hydrogen fluoride (200 ml.) was placed in a 600 ml. polyethylene beaker and cooled in a salt-ice bath. Sodium cyanide (54 g., 1.0 mole) was added slowly as the reaction is very strongly exothermic. Large quantities of fumes were given off with each addition of NaCn and required 1½ hours for total addition. The homogeneous solution was poured into a 300 ml. Monel reactor and the contents in turn were pressured into the 1-liter autoclave. Cyclohexene (82 g., 1.0 mole) was pumped into the reactor at 15° C. over a period of 45 minutes and the mixture was heated to 50° C. for 1¼ hours. Workup was as described previously with 92.9 g. of red-brown oil being obtained. About 30 ml. of 85% acetone was added and the mixture filtered to give 30.6 g. of yellow crystals. Recrystallization from hexane gave 20.9 g. (17.3% yield) of yellow crystals, M.P. 110–116° C. When washed with cold pentane they melted at 118–120° C. Mixed melting point with authentic material gave no depression.

EXAMPLE IV

N,N'-dicyclopentyl-2-(cyclopentylamino)malonamide

The 1-liter autoclave was charged with 160 ml. (8.0 moles) hydrogen fluoride, 33 g. (48 ml., 1.2 moles) hydrogen cyanide and pressured to 1000 p.s.i.g. with carbon monoxide. Cyclopentene (68 g., 1.0 mole) was pumped in the stirred reactor at a rate of 3–4 ml./min. over a period of 35 minutes at 20–22° C. The reactor was heated to 44–50° C. and stirred 2½ hours. No drop in pressure was noted. The reactor was cooled to 22° C., the pressure released and 300 ml. $H_2O$ and 200 ml. $CHCl_3$ were pumped into the reactor After drainage into plastic separatory funnels, the aqueous acid layer was extrated twice with $CHCl_3$ and the extracts combined with the $CHCl_3$ layer initially pumped into the reactor. The aqueous layer was discarded and the red-brown $CHCl_3$ layer was poured on ice and made basic with NaOH solution. An emulsion formed and filtration was necessary to produce a workable mixture. The $CHCl_3$ layer in the basic form was dried over $MgSO_4$ and removal of the solvent left 95.3 g. of a very dark oil which tended to crystallize on standing.

Various methods were used to isolate the crystalline component in pure state and are tabulated below:

(1) A small amount was triturated with cold acetone, filtered, and washed with cold acetone. Recrystallization from n-hexane gave a white crystalline compound, M.P. 125–127° C.

(2a) 4.00 g. of the crude material was triturated with 6 ml. cold acetone. On filtration 0.45 g. of buff-colored crystals was obtained. Evaporation of the solution gave 3.50 g. of viscous residue.

(b) When the trituration is carried out with 1.0 ml. of acetone 0.43 g. of crystals was obtained with 3.70 g. residue.

(c) With 4.0 g. of initial material triturated in 5 ml. methylethyl ketone, 0.43 g. of buff-colored crystals was formed.

(3) Analytical sample: 16.0 g. of the residue was triturated with 5 ml. of 90% acetone and filtered to give 2.55 g. of crystals which were recrystallized from hexane to give 1.70 g. of white crystals. These were combined with crystals in sec. (2a) and recrystallized from 50 ml. hexane to give star-shaped crystals, M.P. 126–128° C.

*Analysis.*—Calcd. for $C_{18}H_{31}N_3O_2$ (percent): C, 67.23; H, 9.73; N, 13.08. (Mol. wt., 321.29.) Found (percent): C, 618.12; H, 10.22; N, 13.11. (Mol. wt., 319—osmometry.)

The infrared spectrum indicated a simple amide with no unsaturation.

EXAMPLE V

N,N'-dicyclododecyl-2-(cyclododecylamino)malonamide

The 1-liter autoclave was charged with 200 ml. (10.0 mole) hydrogen fluoride and 33 g. (48 ml., 1.2 mole) hydrogen cyanide. Cyclododecene (85% pure; the remaining 15% was cyclododecane and cyclododecadiene), 166 g. (1.0 mole), was pumped into the reactor at 16° C. over a period of 52 minutes. The mixture was heated with stirring at 50° C. for an additional two hours. The reactor was cooled and 300 ml. $H_2O$ was added followed by 200 ml. $CH_2Cl_2$. The mixture was drained from the reactor and extracted further with $CH_2Cl_2$. Solvent removal left 204.7 g. of red-brown solids possessing a waxy feeling. Acetone (300 ml.) was added to the residue which was allowed to stand over the weekend. The material did not dissolve, but many solid lumps remained. The solids were filtered off and washed with acetone. Leaching of impurities was accomplished by placing the solids in 100 ml. n-hexane, boiling and adding 500 ml. absolute ethanol. Filtration gave 25 g. of solids melting at 152–155° C. On cooling buff-colored crystals formed, M.P. 152–155° C., 31.7 g. Recrystallization of all the crystals was effected by suspension in 600 ml. of isopropyl ether heated to boiling and adding benzene dropwise to the hot solution until solution was complete. On cooling 28.5 g. of nearly white crystals were obtained, M.P. 153–154.5° C. This represents a 14% yield; however, no attempts were made to optimize the yield.

*Analysis.*—Calcd. for $C_{39}H_{73}N_3O_2$ (percent): C, 76.04; H, 11.94; N, 6.82. Found (percent): C, 76.13; H, 12.06; N, 6.72.

The original acetone extract was evaporated to dryness, triturated with acetone, filtered, dried and recrystallized from isopropyl ether to give 19.8 g. of tan-colored crystals, M.P. 110–112° C. The solvent employed for the gross recrystallization was evaporated and taken up in acetone to give 19.6 g. of tan crystals, M.P. 88–98° C., a second recrystallization yielded 10.4 g., M.P. 91–96° C.

EXAMPLE VI

N,N'-di-2-norbornyl-2-(norbornylamino)malonamide

In a 1-liter Monel beaker with a cover containing apertures for an addition funnel and thermometer and being magnetically stirred, was charged 80 ml. (4.0 mole) hydrogen fluoride and 25 ml. (17.2 g., 0.64 mole) hydrogen cyanide and cooled in an ice bath to 0° C. 2-norbornene (47.0 g., 0.50 mole) was added by means of a spatula over a period of 37 minutes. Five hours later, 150 ml. of water was added, followed by 100 ml. $CH_2Cl_2$. The $CH_2Cl_2$ layer was shaken with diluted NaOH until neutral and removal of the solvent left 60.0 g. of a viscous amber liquid. A portion of the material was triturated with 85% acetone to give solids which when recrystallized from n-hexane and ethanol melted at 180.5–182° C. A total of 7.1 g. of product was obtained.

*Analysis.*—Calcd. for $C_{24}H_{37}N_3O_2$ (percent): C, 72.14; H, 9.33; N, 10.52. (Mol. wt., 399.6.) Found (percent): C, 71.94; H, 9.32; N, 10.23. (Mol. wt., 419.)

The infrared and nmr spectra were consistent with the structure postulated.

EXAMPLE VII

N,N'-dipentyl-2-(pentylamino)malonamide (a mixture of isomers in which pentyl is 1-methylbutyl or 1-ethylpropyl)

The 1-liter Monel autoclave was charged with 160 ml. (8.0 mole) hydrogen fluoride and 33 g. (48 ml., 1.2 mole) hydrogen cyanide. Pentene-1 (70 g., 1.0 mole) was pumped into the reactor at 18° C. over a period of 42 minutes. It was then heated at 45–50° C. for 2 hours, followed by cooling and addition of 300 ml. water and 200 ml. $CH_2Cl_2$. The $CH_2Cl_2$ layer was collected and aqueous acid layer extracted with $CH_2Cl_2$. The organic layers were combined and shaken with NaOH-$H_2O$ giving a considerable emulsion. The emulsion could be somewhat broken by filtration. Removal of the $CH_2Cl_2$ after separation and drying over $MgSO_4$ gave 90.4 g. of a brown viscous liquid. (Neutralization of the original acid solution with $NH_4OH$ and extraction gave 6.0 g. of a residue which was discarded.) Crystallization was achieved by immersing the flask in ice and adding 150 ml. hexane. Filtration and two additional crystallizations gave a total of 4.2 g. of white crystals, M.P. 76–78° C.

*Analysis.*—Calcd. for $C_{18}H_{37}N_3O_2$ (percent): C, 66.01; H, 11.39; N, 12.83. (Mol. wt., 327.) Found (percent): C, 66.16; H, 11.42; N, 12.86. (Mol. wt., 324—osmometry.)

The following table lists the olefins reacted in the previous examples with the properties of the resulting substituted 2-aminomalonamides.

TABLE I.—REACTION PARAMETERS AND YIELD DATA FOR SUBSTITUTED 2-AMINOMALONAMIDES

| Olefin | Olefin grams | Olefin Mol. | HCN, mol. | HF. mol. | Addition time, minutes | Reaction time, hours | Temperature, °C. | CO or $N_2$ pressure | Initial residue, grams | Crude yield, percent | Purified, grams | Purified, mol. | Yield, percent | Recrystallization solvent | M.P. |
|---|---|---|---|---|---|---|---|---|---|---|---|---|---|---|---|
| Propylene | 45 | 1.07 | 1.2 | 8.0 | 12 | 2.0 | 50 | None | 45.3 | 53 | 20.2 | 0.083 | 23.3 | Pentane | 103–104 |
| Cyclopentene | 68 | 1.0 | 1.2 | 8.0 | 35 | 2.5 | 44–50 | 1,000, CO | 95.3 | 99 | (¹) | | ~10 | Hexane | 126–128 |
| Cyclohexane | 164 | 2.0 | 2.4 | 8.0 | 38 | 4.0 | 45 | 800, $N_2$ | 258.4 | ~100 | 47.0 | 0.13 | 19.4 | 85% $Me_2CO$ | 120–122 |
| Cyclododecene | 166 | 1.0 | 1.2 | 10.0 | 62 | 2.0 | 50 | None | 204.7 | 100+ | 28.5 | 0.046 | 14.0 | Isopropyletherbenzene | 153–154.5 |
| Pentene-1 | 70 | 1.0 | 1.2 | 8.0 | 42 | 2.0 | 45–50 | do | 90.4 | 83 | 4.2 | 0.013 | 3.9 | Hexane-EtOH | 76–78 |
| 2-norbornene | 47 | 0.50 | 0.64 | 4.1 | 37 | 5.0 | 0–20 | do | 60.0 | 90 | 7.1 | 0.011 | 10.6 | Hexane-EtOH | 180.5–181 |

¹ Yield not determined since many portions were used to ascertain optimum crystallization procedures.

EXAMPLE VIII

N,N'-dicyclohexyl-2-(cyclohexylamino)malonamide as an antiplasticizer and processing aid for poly(vinyl chloride)

Two blends of poly(vinyl chloride) with various additives were prepared, the formulations being similar except that only one of them contained N,N'-dicyclohexyl-2-(cyclohexylamino)malonamide. Each of the blends was milled on a roll mill at 320° F., and the resulting mill stock was molded at 370° F. and 1100 p.s.i. into a sheet one-sixteenth inch thick. Test specimens for physical property determinations were obtained from the molded sheet.

The composition of the blends and the physical properties of the molded sheets are summarized in Table II.

TABLE II

| Composition | I | II |
|---|---|---|
| Diamond PVC-40,[1] parts by weight | 90 | 50 |
| Advastab T-360,[2] parts by weight | 2.0 | 1.0 |
| Dibutyltindilaurate,[3] parts by weight | 1.0 | 0.5 |
| Advawax 280,[4] parts by weight | 0.5 | 0.25 |
| Advawax 140,[5] parts by weight | 0.5 | 0.25 |
| N,N'-dicyclohexyl-2-(cyclohexylamino)malonamide, parts by weight | 10 | 0 |
| Tensile yield,[6] p.s.i. | 10,200 | 7,670 |
| Elongation break,[6] percent | 41 | 51 |
| Flexural modulus,[7] p.s.i.×10⁻³ | 466 | |
| Hardness, Shore D[8] | 84 | |
| Density, g./cc | 1.3562 | |

[1] Poly(vinyl chloride) of designation GP 3-15340 according to ASTM D-1755-60T.
[2] Polymeric dibutyl tin modified mercaptide stabilizer.
[3] Stabilizer.
[4] N,N'-ethylenebis-stearamide lubricant.
[5] Edible fatty ester lubricant.
[6] ASTM D-638-61T.
[7] ASTM D-790-63.
[8] ASTM D-1706-64T.

Table II shows that the value for the tensile yield was higher and the value for the elongation break was lower for the test specimen containing N,N'-dicyclohexyl-2-(cyclohexylamino)malonamide, demonstrating that this substituted 2-aminomalonamide functioned as an antiplasticizer for poly(vinyl chloride). The flexural modulus, hardness, and density of the product containing the substituted 2-aminomalonamide also were found to be within a desirable range.

In additional studies, Composition I in Table II was compared with another composition differing only in that the substituted 2-aminomalonamide was replaced with an equal weight of Blendex 401, a polystyrene resin used as impact modifier. Of the two compositions thus prepared, the composition containing N,N'-dicyclohexyl-2-(cyclohexylamino)malonamide was found to have the lower processing temperature, to require a smaller amount of time to flux, and to require less energy to mix, even though the Blendex 401 resin itself was known to improve processing operations. Thus, N,N'-dicyclohexyl-2-(cyclohexylamino)malonamide functioned as a processing aid for poly(vinyl chloride).

I claim:
1. A substituted 2-aminomalonamide having the formula:

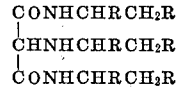

wherein R is selected from hydrogen and alkyl and wherein two R groups taken together on adjacent carbon atoms form a divalent radical selected from alkylene and cycloalkylene, the total number of carbon atoms in the malonamide not exceeding 39 carbon atoms.

2. A substituted 2-aminomalonamide according to claim 1 which is N,N'-diisopropyl-2-(isopropylamino)malonamide.

3. A substituted 2-aminomalonamide according to claim 1 which is N,N'-dicyclohexyl-2-(cyclohexylamino)malonamide.

4. A substituted 2-aminomalonamide according to claim 1 which is N,N'-dicyclopentyl-2-(cyclopentylamino)malonamide.

5. A substituted 2-aminomalonamide according to claim 1 which is N,N'-dicyclododecyl-2-(cyclododecylamino)malonamide.

6. A substituted 2-aminomalonamide according to claim 1 which is N,N'-di-2-norbornyl-2-(2-norbornylamino)malonamide.

7. A substituted 2-aminomalonamide according to claim 1 which is a mixture of N,N'-dipentyl-2-(pentylamino)malonamides, where pentyl is 1-methylbutyl or 1-ethylpropyl.

8. A substituted 2-aminomalonamide according to claim 1 which is N,N'-diethyl-2-(ethylamino)malonamide.

References Cited

UNITED STATES PATENTS 3,338,967  8/1967  Potts et al.  260—562

OTHER REFERENCES

Chemical and Engineering News, page 42, February 23, 1970.

HENRY R. JILES, Primary Examiner

H. I. MOATZ, Assistant Examiner

U.S. Cl. X.R.

260—28.5, 32.6, 561, 999